United States Patent [19]
Balsells

[11] Patent Number: 6,161,838
[45] Date of Patent: Dec. 19, 2000

[54] CARTRIDGE SEAL STACK

[75] Inventor: Peter J. Balsells, Newport Coast, Calif.

[73] Assignee: Bal Seal Engineering, Co, Inc., Foothill, Calif.

[21] Appl. No.: 09/526,427

[22] Filed: Mar. 15, 2000

Related U.S. Application Data

[63] Continuation-in-part of application No. 09/037,324, Mar. 9, 1998, Pat. No. 6,050,572.

[51] Int. Cl.$^7$ .............................. F16J 15/18; F16J 15/32
[52] U.S. Cl. ........................... 277/511; 277/551; 277/572
[58] Field of Search ..................................... 277/510, 511, 277/529, 534, 540, 551, 554, 570, 572, 576

[56] References Cited

U.S. PATENT DOCUMENTS

| | | |
|---|---|---|
| 5,269,536 | 12/1993 | Matsushima et al. . |
| 5,299,811 | 4/1994 | Kershaw . |
| 5,813,676 | 9/1998 | Antonini et al. . |
| 5,855,375 | 1/1999 | Wilcox et al. . |
| 5,979,904 | 11/1999 | Balsells . |
| 5,984,316 | 11/1999 | Balsells . |
| 6,076,645 | 6/2000 | Winkelmann et al. . |

*Primary Examiner*—B. Dayoan
*Assistant Examiner*—John L. Beres
*Attorney, Agent, or Firm*—Walter A. Hackler

[57] ABSTRACT

A cartridge seal stack utilizes a plurality of rotary cartridge seals each including a cold flowable plastic ring having a body for sealably engaging a housing bore and a lip for sealably engaging a shaft rotating within the housing bore. A spring is provided and disposed between the body and the lip for biasing the lip against the shaft and a separable metal retainer is provided for fixing the plastic ring within the housing bore and around the shaft. The separable metal retainer includes a surface of revolution with a rear portion having a radius suitable for press fitting into the housing bore and a front portion of lesser radius ending the ring. An internal groove is provided in the body of the plastic ring for engaging the ring in order to latch the plastic ring and metal retainer together. A spring portion connecting the retainer rear portion and the ring is provided for controlling residual stress in a radial direction within the plastic ring and preventing shrinkage of the plastic ring toward the shaft.

32 Claims, 11 Drawing Sheets

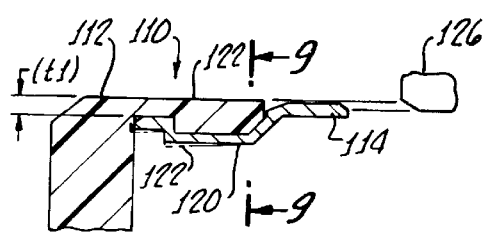
_Fig. 7._
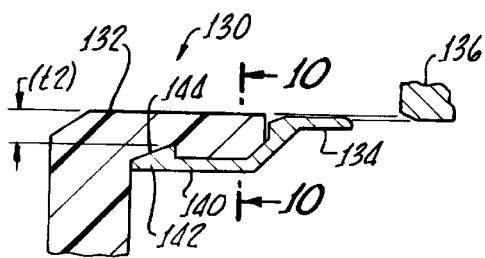
_Fig. 8._
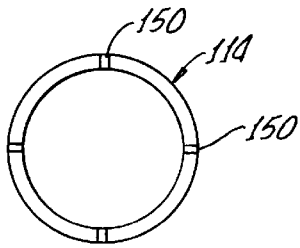
_Fig. 9._
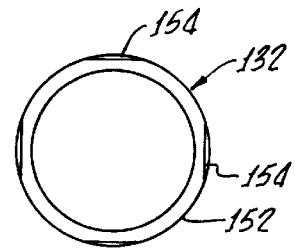
_Fig. 10._
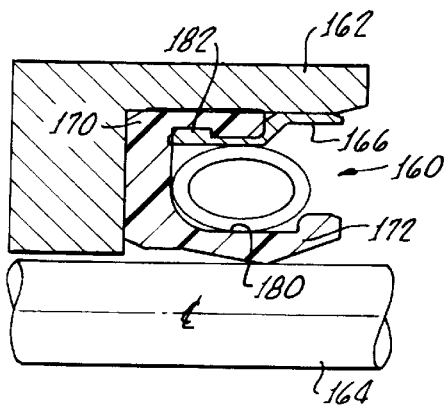
_Fig. 11._
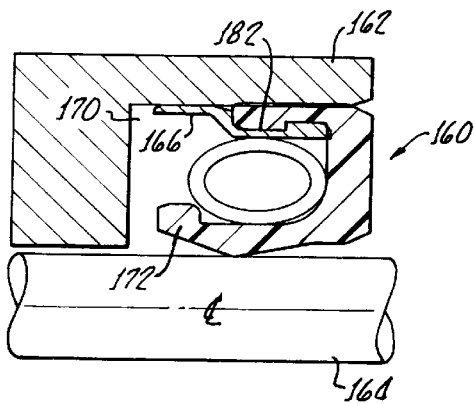
_Fig. 12._

1

CARTRIDGE SEAL STACK

The present application is a continuation-in-part of U.S. Ser. No. 09/037,324 filed Mar. 9, 1998, now U.S. Pat. No. 6,050,572.

The present invention generally relates to a stack of cartridge rotary seals that are pressed into a housing and provide a seal around a shaft at relatively low pressures under various fluid environments. More particularly, the present invention is directed to a stack of cartridge seals mounted in a housing or on a shaft, which are designed primarily for use in reciprocating, rotary and static applications.

Cartridge rotary seals have been used for many years in a variety of applications for the sealing of various types of fluids and gases. Generally these seals use an elastomer as the seal material and such elastomer is molded and bonded to a supporting metal ring.

The materials described in this application utilize various types of plastics, such as ploytetrafluoroethylene PTFE because it exhibits relatively low friction and it is chemically inert and can withstand a variety of temperatures, thus enabling their use under conditions with no lubrication. Other plastic materials may be used, such as ultra high molecular weight polyethylene, but it has limited temperature capabilities and limited chemical compatibility with a high degree of friction.

The prior art cartridge seals utilized the elastomer in a bonded relationship and continuous tube bears around the shaft.

As hereinabove noted, when plastics are utilized, like PTFE, the plastic is mechanically retained to the metallic ring and the entire assembly is pressed into the housing with a high degree of interference between the OD of the seal and the housing to permit retention of the seal assembly into the housing and at the same time, providing static sealing against the housing. Dynamic sealing between the seal and the shaft is provided by the contact between the plastic and the shaft.

A common problem with the prior art is that the elastomer when subjected to heat, produced a high degree of friction and wear and also have limited chemical compatibility that limits the life of the seal and can cause seal failure.

Heretofore seals have been stacked between a housing and the shaft in order to enhance overall sealing therebetween. Generally, the type of seals that have been used for stacking are known as "V-Rings". Such rings are circular and have a "V" cross section. The rings are stacked with a hard support ring that bears against a housing end. The V-Rings stack is generally made from the elastomeric materials or combinations of elastomeric materials as well as plastics, such as PTFE and combinations thereof. Unfortunately, fluid pressure applied to the stack is transmitted equally throughout the entire seal stack so all seals were subject to the fluid pressure. In addition, heretofore, seals stacks utilizing V-Rings provide for no radial adjustment. Accordingly, as the seals wear, leakage increases and eventually the replacement of the seals is necessary due to such leakage.

The present invention provides for a seal stack assembly in which pressure is concentrated on a primary seal while other seals in the stack provide other functions, such as better sealing, longer life of variations and design, etc. Accordingly, the seal stack in accordance with the present invention can withstand fluid pressure with little deformation.

SUMMARY OF THE INVENTION

The rotary cartridge seal stack assembly in accordance with the present invention generally includes a plurality of rotary cartridge seals disposed in an abutting relationship with one another, the plurality of cartridge seals being disposed between a housing bore in a shaft.

In one embodiment, each of the cartridge seals include a cold flowable plastic ring having body means for sealably engaging a housing bore and lip means for sealably engaging a shaft rotating within the housing bore. Separable metal retainer rings are provided for fixing the plastic ring between the housing bore and around the shaft with the separable metal retainer means each having a surface of revolution with a rear portion having a radius suitable for press fitting into the housing bore.

An internal groove in the body means is provided for engaging the ring in order to latch the plastic ring in metal retainer means together with residual stress in both axial and radial directions with the plastic ring, due to the groove and ring dimensions as well as shape. The internal groove has a diameter greater than the ring, and a width of the internal groove is smaller than a width of the ring in order to maintain axial stress in the plastic ring.

In another embodiment, the present invention each of the rotary seal cartridges include a cold flowable plastic ring having body means for sealably engaging housing bore and lip means for sealably engaging a shaft rotating within the housing bore. Spring means are provided and disposed between the body means and lip means for biasing the lip means against the shaft.

A separable metal retainer provides means for fixing the plastic ring and spring within the housing bore and around the shaft with the separable metal retainer having a surface of revolution having a radius suitable for press fitting into the housing bore and a front portion of lesser radius ending in a ring. The rear portion of the metal retainer and the ring are connected by a thin spring portion.

The means defining an internal groove in the body means in provided for engaging the ring therein in order to latch the plastic ring and metal retainer means together with residual stress in a radial direction within the plastic ring due to biasing action by the retainer means spring portion.

BRIEF DESCRIPTION OF THE DRAWINGS

The advantages and features of the present invention would be better understood by the following description when considered in conjunction with the accompanying drawings, in which:

FIG. 7 is a cross sectional view of another embodiment of the present invention illustrating the application of radial stress in the plastic ring;

FIG. 8 is a cross sectional view of yet another embodiment of the present invention showing a ring portion in the metal retainer having a generally arrow shaped cross section;

FIG. 9 is a view taken along the line 9—9 of FIG. 7 showing longitudinal slots in the metal retainer;

FIG. 10 is a view taken along the line 10—10 of FIG. 8 showing flat portions on a forward portion of the plastic ring to prevent rotation thereof within the housing;

FIG. 11 is yet another embodiment of the present invention illustrating the use of a spring disposed within the plastic ring for biasing the lip and bearing against the metal retainer;

FIG. 12 is another illustration of the embodiment shown in FIG. 11 showing its ability to be disposed between the housing and the shaft in a reversed direction;

DETAILED DESCRIPTION

A description of individual seal cartridges suitable for stacking in accordance with the present invention will at first be discussed. Thereafter, the stacking of such individual seal cartridges will be described.

Figure 1:
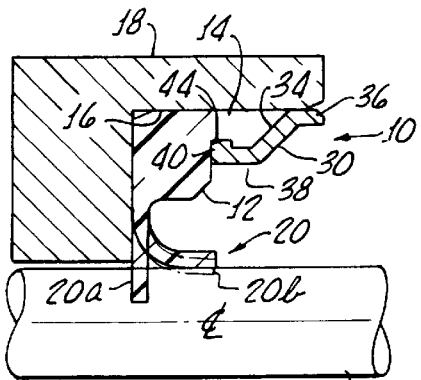
FIG. 1 is a cross sectional view of a stackable rotary cartridge seal, in accordance with the present invention, disposed between a housing and a shaft with the seal generally including a plastic ring with a separable metal retainer for fixing the plastic ring within the housing and around the shaft.

Turning now to FIG. 1, there is shown a rotary cartridge seal 10 in accordance with the present invention which generally includes a cold flowable plastic ring 12 having a body 14, which provides means for sealably engaging a housing bore 16, formed in a housing 18, and a lip 20 which provides means for sealably engaging a shaft 26. In FIG. 1 the lip 20 is shown in dashed line 20a in a position before seal 10 is inserted between the housing 18 and shaft 26 and the dashed line 20b represents an effective range of sealing for the lip 20.

Importantly, the present invention utilizes a cold flowable plastic material, such as PTFE, PTFE compositions with various fillers or UHMW to enable the flow of the material when properly stressed in accordance with the present invention. In fact, the residual stress maintains the plastic ring in intimate contact with a separate metal retainer 30 in a manner which creates residual stress for maintaining the components together within specific temperature parameters.

No permanent bonding occurs between the plastic ring 12 and the metal retainer 30, with the latter providing a means for retaining the plastic ring within the housing bore 16 and around the shaft 26. As shown, the separable metal retainer 30 includes a surface of revolution 34 having a rear portion 36 with a diameter suitable for press fitting into the housing bore 16 and a front portion 38 having a lesser diameter which ends in a ring 40.

Figure 2:
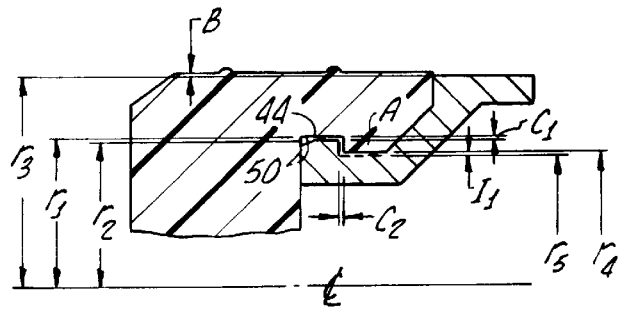
FIG. 2 is an enlarged cross sectional view of a portion of the seal shown in FIG. 1 showing greater detail of the engagement between the metal retainer and the plastic ring.

An internal groove 44 within the plastic ring body 14, as more clearly shown in FIG. 2, has a radius $r_1$ greater than a ring radius $r_2$, resulting in a clearance $C_1$. Such clearance facilitates assembly of the metal part into the plastic groove. The metal ring front portion 38 adjacent the ring 40 has an outside radius less than a contacted inside radius of the plastic ring body 14 indicated as interference $I_1$, in order to maintain the radial stress in the plastic ring body 14.

In addition, a width of the groove 44 is greater than a width of the ring as indicated by the clearance $C_2$. Such clearance facilitates assembly of the two parts. However, upon insertion of the seal 10, between the housing 18 and the seal O.D. 12, causes cold flow of the PTFE into the groove 44 and around the ring 40 creating an axial stress in the plastic ring 12. This deformation force can be applied radially, axially or a combination of radial axial forces with the purpose of providing locking action between the plastic ring 12 and the metal retainer 30.

Depending upon the wall thickness of the plastic ring 12, additional radial loading may be provided by the metal retainer 30 so as to exert added axial spring-like force to maintain greater and longer intimate contact between the plastic ring 12 and the housing 18. As hereinafter described in greater detail with regard to other embodiments of the present invention, seals in accordance with the present invention provide sealing throughout a greater temperature range. The metallic retainer 30 may be designed to add flexibility and increase the loading force as the temperature increases and the bearing stress of the PTFE decreases. In this manner, a spring force provided by the metallic retainer 30 maintains an improved sealing ability of the cartridge seal 10 while maintaining contact between the seal OD and the housing 18.

The groove 44 in the plastic ring body 14 and the ring 40 portion of the metal retainer 30 is assembled as a rotary cartridge seal 10 by forcing the metal retainer 30 into the plastic ring 12 which expands the plastic ring 12 radially and causes the plastic ring 12 to "snap" which creates a diametrical interference between the ID of the plastic ring 12 and the OD of the metal retainer 30 at an area A so that a residual circular stress remains.

In this instance, "snap" refers to the radial and/or axial expansion of the plastic which allows plastic to return to its normal position but creates a radial or axial residual stress around the expanded surfaces.

Upon assembly of the plastic ring 12 and metal retainer 30 into the housing bore 16 and over the shaft 26 causes a diametrical force, as hereinabove noted, to be applied on the plastic ring 12. Interference between the OD of the plastic ring 12 and the housing bore 16 provides a radial load on the plastic ring 12 for maintaining intimate contact between the OD of an area A of the metal retainer 30 and the plastic ring 12.

Inasmuch as this interference adds to stress, which is maintained between the two surfaces, the metal retainer 30 and plastic ring 12 are locked both axially and radially. Excess plastic flows around the outside radius $r_3$ of the plastic seal which creates an interference with the housing indicated at B in FIG. 2. In addition, this cold flow, enabled through the use of PTFE, causes filling of the clearance $C_2$ and gap between the ring 40 and the groove 44 to provide axial stress and positive latching or locking of the metal retainer 30 and the plastic ring 12. Naturally, in this regard, proper spring-like metal retainer 30 material must be utilized, such as, for example, preferably stainless steel.

It should be appreciated that the plastic ring 12 and the metal retainer 30 may be locked in place by either an axial locking action, a radial locking action or a combination of both. That is, there may be axial clearance at assembly, which may or may not be filled by the cold flowing of the material, as in $C_2$, FIG. 2, or radial clearance at assembly as in $C_1$ and such clearance may remain or may not remain after cold flow of the material. But in all cases, there will be some sort of residual induced stress, be axial, radial, or a combination of axial and radial.

More specifically, and by way of example only, the plastic PTFE ring may have an outside radius of between about 19.000 mm and about 19.126 mm with a housing having a radius between about 19.063 mm and about 19.037 vacating a radial interference ranging between about 0.089 mm–0.0035" to about 0.063 mm–0.0024".

The plastic ring groove may have a radius of $r_1$, between about 17.907 mm and about 17.882 mm with a metal ring groove diameter $r_2$ of between about 17.832 mm and about 17.356 mm having a radial clearance between about 0.000 mm to about 0.051 mm.

The plastic ring groove radius $r_5$ may have a radius of between about 17.526 mm and about 17.500 mm with a metal ring radius $r_4$ of between about 17.597 mm and about 17.551 mm having a radial interference between about 0.092 mm to about 0.025 mm.

In addition, the difference between the groove 44 width and ring 40 width may provide for clearance $C_2$ of between about 0.000 mm and about 0.051 mm.

This configuration enables sealing between the housing 18 and the shaft 26 at temperatures between about −20° C.

and about 100° C. at shaft rotational speeds of up to 5000 RPM, when using PTFE compositions, as for example, containing 20% carbon, 5% graphite, 78% PTFE.

Figure 3:
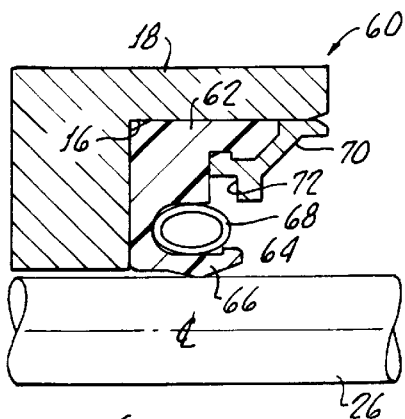
FIG. 3 is a cross sectional view of another stackable seal in accordance with the present invention in which a spring is disposed in a position for biasing a lip of the plastic ring against a shaft and a metal retainer includes a step for facilitating separation of the metal retainer from the housing bore.

Another embodiment 60 in accordance with the present invention is shown in FIG. 3 in which plastic ring 62 includes a second groove 64 adjacent a lip 66 is provided for receiving a spring 68 for biasing the lip 66 against the shaft 26.

In addition, a metal retainer 70 which is similar in design to the retainer 30 but which includes an inwardly extending step 72 which provides means for facilitating separation of the metal retainer 70 from the housing bore 16 along with the plastic ring 62.

Figure 4:
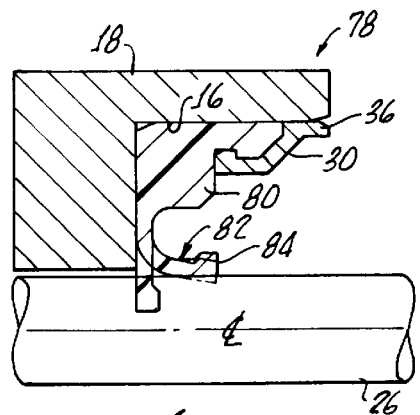
FIG. 4 is another embodiment of the present invention similar to that shown in FIG. 1, but with the plastic ring having a lip thereon with an enlarged head portion.

A further embodiment 78 of the present invention is shown in FIG. 4 in which common character references refer to identical or substantially the same elements shown in FIG. 1. In this embodiment 78, a plastic ring 80 includes a lip portion 82 having a head 84 thereof which provides a means for contacting the shaft 26 over a greater area.

Figure 5:
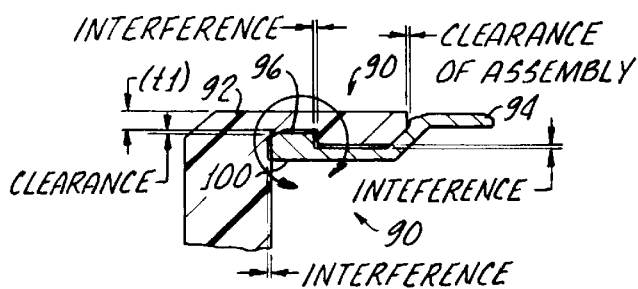
FIG. 5 is a cross sectional view of yet another embodiment of the present invention in which the plastic ring includes a thin forward portion and radial stress, as hereinafter discussed in greater detail, is provided by an extended or cantilever portion of the metal ring.

Turning now to FIG. 5, yet another embodiment 90 in accordance with the present invention includes a plastic ring 92 and a metal retainer 94. In this instance, the plastic ring 92 includes a relatively thin wall thickness $t_1$, and accordingly, no radial snapping action occurs due to the flexibility of the plastic ring 92 at that point. However, snapping action occurs axially as hereinabove described in accordance with the embodiments shown in FIGS. 1–4.

In the rotary cartridge seal embodiment 90 shown in FIG. 5, the ID of the plastic ring 92 expands radially during assembly which allows partial entry of the metal retainer 94 into the plastic ring groove 96. Sufficient force is applied axially which causes axial deformation of the plastic ring 92 at the groove 96, that creates an axial snap action by compressing and deforming the plastic ring 92 axially around the groove 96 area.

The axial deformation of the plastic ring 92 causes a residual stress that maintains axial as well as radial contact with the groove 96 in order to lock the plastic ring 92 in the metal retainer 94 together. This configuration adds to reliability and ability of the seal 90 at higher temperatures through the combined axial and radial residual stresses that remain in the plastic ring 92.

Figure 6:
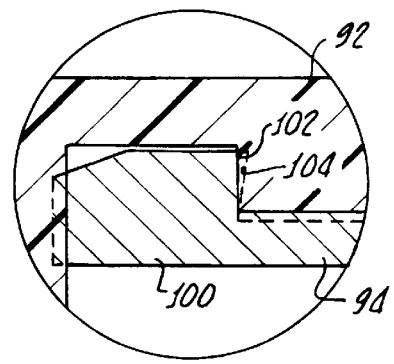
FIG. 6 is an enlarged cross sectional view taken along the line 6—6 of FIG. 5 showing a groove and dovetail arrangement for facilitating cold flow of plastic material.

The groove ring 100 on the metallic retainer 94 may be dovetailed as shown in FIG. 6, or it may be squared. A dovetailed design facilitates assembly of the metal ring 94 into the plastic ring 92. In addition the dovetail 102 as well as a corresponding dovetail 104 in the plastic ring 92 enables a greater amount of cold flowing of the PTFE material of the ring 92 into the area therebetween. This provides for a more substantial locking of the plastic ring 92 and the metal retainer 94.

Referring to FIG. 7, another rotary cartridge seal embodiment 110 in accordance with the present invention which is similar in design to the seal 10 hereinabove discussed in connection with FIG. 1.

A plastic ring 112 is provided as well as a metallic retainer 114. However, in this instance, a metal retainer 114 is thin-walled. The metal retainer 114 includes a long cantilever front portion 120 which magnifies radial deflection thereof as indicated by the dashed line 122 in FIG. 7. This added spring deflection increases the radial load on the body portion 122 of the plastic ring 112 which provides additional force in addition to the residual force that already exists so that the seal assembly 110 can be used at higher temperature.

The circular deflection of the metal retainer 114, is sufficient to maintain intimate contact between the OD of the plastic ring 112 and the metal retainer 114. It should be appreciated that the residual stress that occurs radially and axially during assembly decreases as the temperature increases. Accordingly, this added radial spring force, caused by the thin section cantilever 122, takes up such loss of residual stress at elevated temperatures and permits the seal assembly to operate at higher temperatures due to such added radial deflection. The seal assembly 110 is pressed and retained into a housing 126 by interference that occurs between the metal ring OD and the housing 16.

FIG. 8 shows a further rotary cartridge seal embodiment 130 in accordance with the present invention including a plastic ring 132 and metal retainer 134 for insertion into a housing 136. A thin cantilever section 140 of the metallic retainer 132 is provided with an arrowhead-shaped head 142, which is forced into intimate contact with a correspondingly shaped groove 144 to create axial locking between the plastic ring 132 and the metal retainer 134. The arrowhead 142 may have a dovetail design as shown in FIG. 6 to improve locking action. Radial interference is provided between the seal OD and the housing 136 to improve seal performance.

Improved flexibility of the cantilever portion 120 of the metallic retainer 114 shown in FIG. 7 may be obtained by providing longitudinal slots 150 as shown in FIG. 9. Slots 150 provide for added deflection and hence greater flexibility of the metal retainer 114 in order to accommodate larger temperature ranges as may be desired.

Further, as shown in FIG. 10, the plastic ring 132 may include a plurality of flats 154 on a circumference 156 in order to prevent rotation of the plastic ring 132 during operation. As hereinabove noted, the cold flow characteristics of the PTFE material utilized in the ring 132 enable material to flow into the flats thereby preventing rotation of the plastic 132.

Yet another embodiment 160 of the present invention is shown in FIGS. 11 and 12. The rotary cartridge seal 160 design enables the cartridge seal 160 to be inserted and utilized between a housing 162 and shaft 164 in opposite directions as are correspondingly represented in FIGS. 11 and 12. A metal retainer 166 is similar to the retainer hereinabove described in connection with retainer 30 shown in FIG. 1, and the plastic ring 170 having a lip 172 is similar in design and function to the plastic ring 62 and lip 66 as described in connection with FIG. 3. In this instance, a plastic ring 170 is U-shaped and a spring 180 is disposed therein between a lip 172 and the metal retainer 166 with the spring 180 being disposed in the position bearing against a metallic retainer front portion 182. This configuration provides for increased sealing ability.

It should be noted that sealing lip designs indicated in FIGS. 1 and 4 may be used in place of the designs indicated in FIGS. 11 and 12.

It should be appreciated that the hereinabove discussed rotary cartridge seals, 10, 60, 78, 90, 110, 130 and 160 provide for an assembly that creates residual stresses to maintain intimate contact between the plastic rings and metal retainers within a specific temperature ranges, for example, between about −20° and about 100° C. Intimate contact between seal surfaces take up for variations that may occur to the PTFE material during usage especially at elevated temperatures. Specifically described dimensions and configurations with regard to clearances hereinabove discussed, control the cold flow of the PTFE material, and limit the shrinkage thereof, while maintaining residual stress in order to maintain intimate contact between the plastic rings and corresponding metallic retainers.

The hereinafter discussed embodiments in accordance with the present invention include means for reducing the assembly force required to assemble the seal and the housing, minimize the variation from seal to seal when assembling the seal into the housing and utilizing a spring for providing bias between a plastic ring seal and a shaft.

Figure 13:
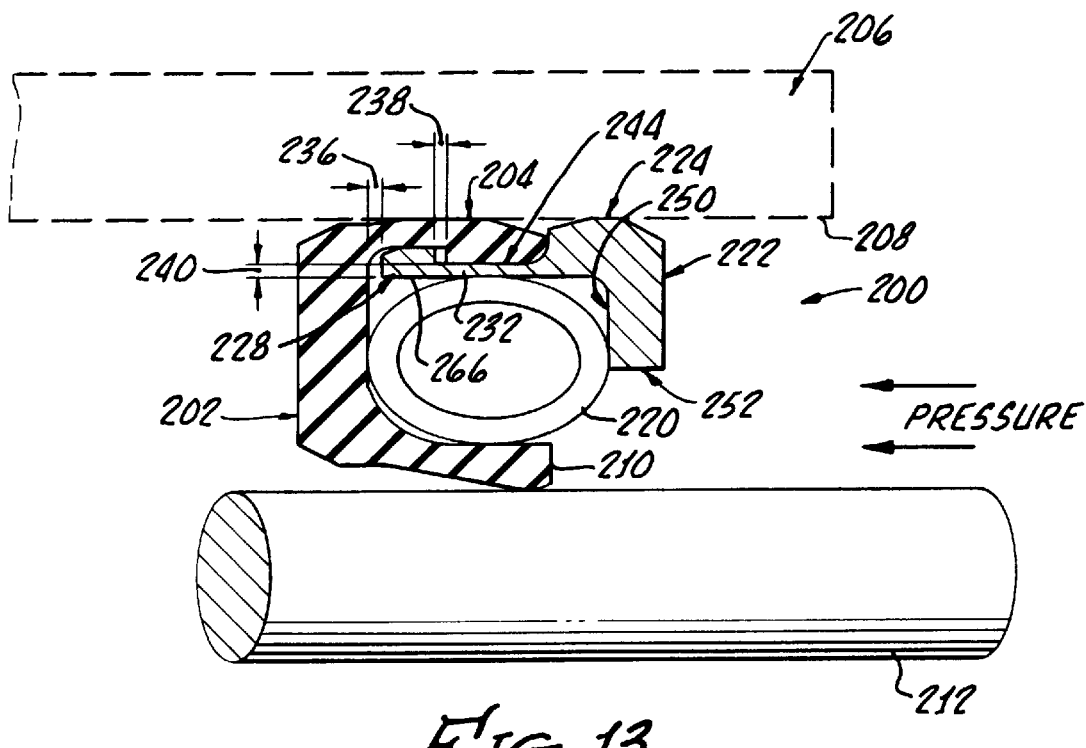
FIG. 13 is a cross sectional view of another embodiment of the present invention showing a rotary cartridge seal, disposed between the housing and the shaft, with the seal generally including a plastic ring with separable metal retainer for fixing a plastic ring within the housing on the shaft, the retainer including a spring portion for controlling residual stress in a radial direction within the plastic ring and preventing shrinkage of the plastic ring toward the shaft.

With reference to FIG. 13, there is shown a rotary cartridge seal 200 in accordance with the present invention which generally includes a cold flowable plastic ring 202 having a body 204 which provides a means for sealably engaging a housing 206 bore 208 and a lip 210 which provides a means for sealably engaging a shaft 212. A spring 220, disposed between the body 204 and the lip 210, provides a means for biasing the lip 210 against the shaft 212.

Separable metal retainer means 222 is provided for fixing the plastic ring 202 within the housing bore 208 and around the shaft 212. The retainer 222 includes a surface of revolution with a rear portion 224 having a radius suitable for press fitting into the housing bore 208 and a front portion 226 of lesser radius ending in a ring 228. Thus, the locking ring-retainer 222, in addition to retaining the seal assembly 200 in the housing 206, also retains the spring energizer 220 within the confines of the seal assembly 200. Between the rear portion 224 and the ring 228 is a spring portion 232 which provides a means for controlling the residual stress in a radial direction within the plastic ring 202 and prevent shrinkage of the plastic ring 202, particularly the body portion 204 toward the shaft 212.

As shown in FIG. 13, clearances 236 and 238 are provided between the ring 228 and the body portion 204 to facilitate assembly of the seal 200. A thin area indicated at 240 of the spring portion 232 of the retainer 222 is utilized to control the spring force of the retainer 222 against the body portion 204. Accordingly, pressure is applied to the body portion 204 at a surface 244.

In addition, because the retainer 222 is flexible through the spring portion 232, the force necessary to assemble the seal 220 between the housing 206 and shaft 212 is significantly reduced. By varying the radial wall thickness of the plastic ring 202 and thickness of the spring portion 232, the seal can be tailored for use in a wide environment of pressures and temperatures.

The embodiment 200 further differs from the hereinabove discussed embodiment 10 in that a step 250 inwardly depending from the rear portion 224 of the retainer 222 facilitates removal of the seal 200 from engagement with the housing 206 and shaft 212. A thickness indicated at 252 of the step 250 provides support for the spring portion 232 and accordingly provides a means for controlling the force needed to press fit the retainer 222 into the housing bore 208.

Figure 14:
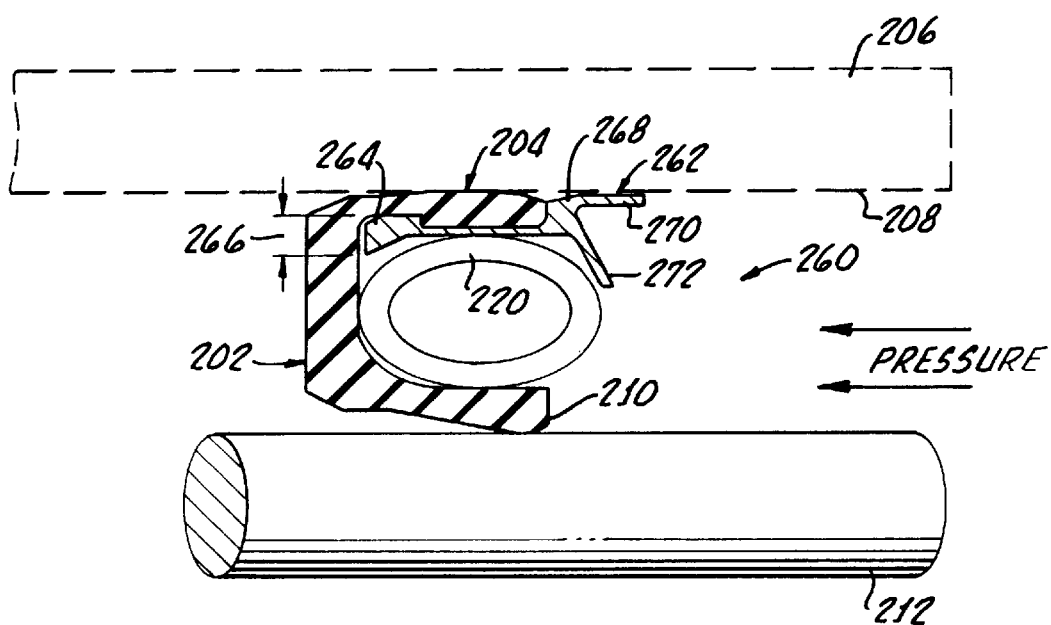
FIG. 14 is a cross sectional view of another embodiment of a stackable seal cartridge in accordance with the present invention utilizing a retainer having a depending thin wall lug for maintaining a spring within the plastic ring and for facilitating removal of the seal from between the housing and the shaft.

With reference to FIG. 14, there is shown yet another embodiment 260 in accordance with the present invention, common character references indicating identical or substantially the same structural components as shown in FIG. 13. In this embodiment the retainer 262 includes a widened ring portion 264 as referenced by the arrows 266.

In addition a rear portion 268 of the retainer 262 includes a thin flange 270 for engaging the housing bore 208 and an inwardly depending flange 272 which provides a means for both holding the spring 220 between the body 204 and lip 210 of the plastic ring 202 and for facilitating removal of the seal 260 from engagement with the housing bore 208 and shaft 212.

The thin flange 270 reduces assembly force and can be of various thicknesses to vary the assembly force. This embodiment reduces the mass around the metal loading portion 268 of the retainer 262 in order to increase flexibility. This is especially important in small diameters.

Figure 15:
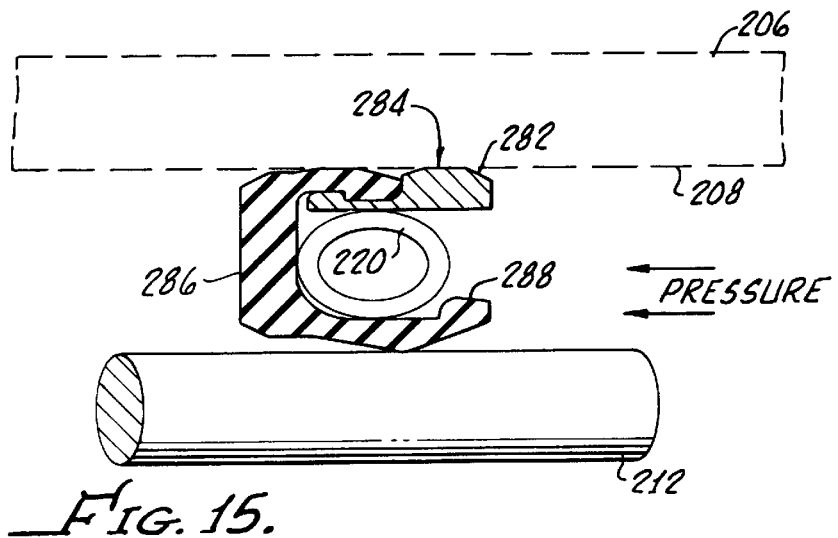
FIG. 15 is another embodiment of the present invention showing variations in wall thickness of the retainer.

A further embodiment 280 of the present invention is shown in FIG. 15 in which the retainer 282 includes a relatively thick body 284 and the plastic ring 286 includes an inwardly extending lip 288 which maintains the spring 220 within the seal 280. This embodiment is particularly useful for large diameter shafts.

FIGS. 16A–16H shows various metal retainer rings 290, 292, 294, 296, 298, 300, 302, 304 which provide various forces and sealing capabilities. As earlier indicated and with reference to FIG. 16A and 16B, a wall thicknesses 310, 312 controls the force required to assemble the seal. Various seals can be provided also to reduce the force required to assemble the seal 290 into a bore, not shown in FIG. 16A–16G. Particularly, the plurality of load rings 314 reduce surface contact as opposed to a flat surface 316 shown in FIG. 16E. It should be appreciated, however, that the flat areas as indicated by the arrows 318 do provide seal stability after assembly.

Figure 16A:
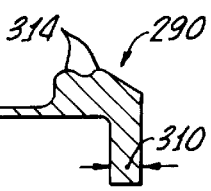
FIG. 16A–16H show various configurations of the locking metal retainer that affect the force applied to the plastic ring and variations of such force.
Figure 16B:
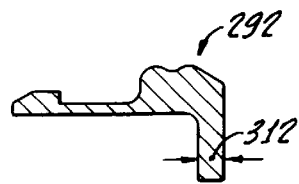
Figure 16C:
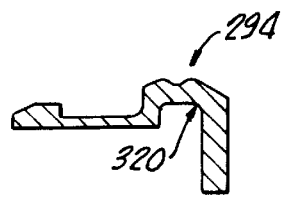
Figure 16D:
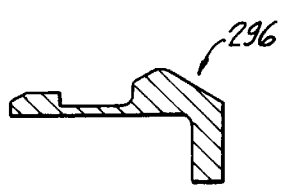
Figure 16E:
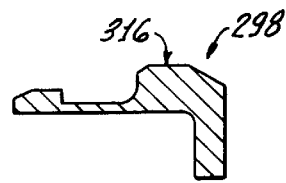
Figure 16F:
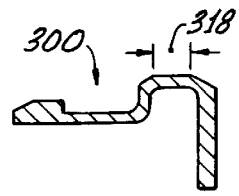

As shown in FIG. 16C, the retainer 294 may be undercut 320 in order to reduce the mass of the retainer 294 while also reducing the force required for assembly. The undercut 320 may be radial, or, as shown in FIG. 16G, the undercut 322, may be axial.

Figure 16G:
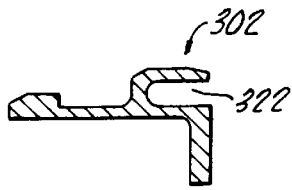
Figure 16H:
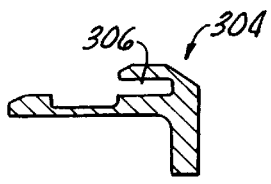

In FIG. 16H the retainer 304 has been modified to provide a circular undercut 306, similar to the retainer 302 shown in FIG. 16G, in order to create greater retainer flexibility for facilitating assembly of the retainer 304 with a plastic ring, not shown, into a housing, also not shown in FIG. 16H.

Figure 17A:
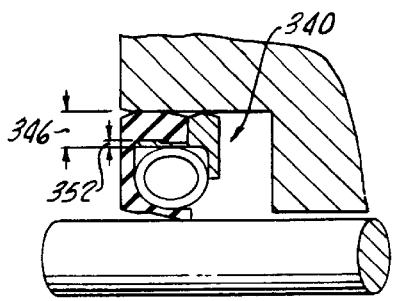
FIG. 17A–17C show variations of the embodiment shown in FIG. 13.
Figure 17B:
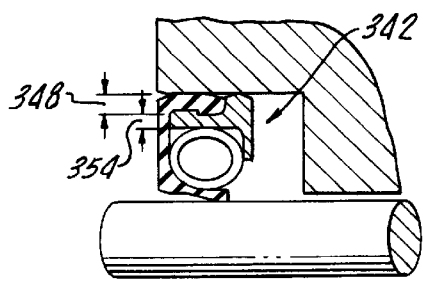
Figure 17C:
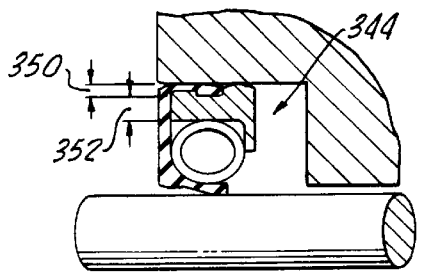

Variations and combinations of plastic ring body thickness and spring portion thickness of the retainer are shown in FIGS. 17A, 17B, 17C. Each of these seals 340, 342, 343, 344 show various thicknesses of the plastic body as indicated by the arrows 346, 348, 350 and spring portion as indicated by the arrows 354, 356. In FIG. 17A, the thick outside wall 346, in combination with a thin spring portion 352, causes high shrinkage of the plastic when subjected to elevated temperatures. FIG. 17B shows a comprising wall thickness of the spring portion 354 and plastic band 348, whereby a certain degree of shrinkage will occur on the plastic rings. However, no defamation will occur on the spring portion 354 due to greater thickness. FIG. 17C shows the embodiment 344 with a thin plastic body 350 and a thickened spring portion 356. These variations are shown in order to provide an understanding of the control of radial stress in the plastic portions 346, 348, 350 through the use of a spring portion in the retainer.

Figure 18:
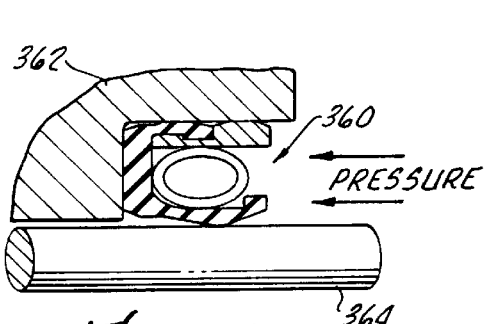
FIG. 18 shows a seal design in accordance with the present invention utilized in a captivated seal gland configuration.

FIG. 18 illustrates a seal 360 utilized as a captivated sealed gland. This type of design can be used in relatively high pressures because, upon application, the pressure, the housing 362 absorbs the pressure force. The assembly force in this type of design should be just enough to prevent the seal 360 from rotating which is caused by a friction developed between the seal 360 and the shaft 364. A minimum amount of force is required which is desirable since damage to the seal is minimized during assembly. The force required to assemble the seal 360 into the housing 362 will depend upon the seal diameter and seal cross section and the reverse pressure acting on the back portion of the seal.

Figure 19:
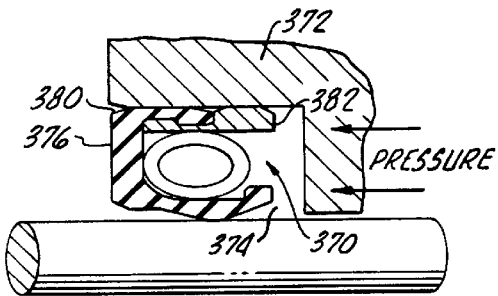
FIG. 19 shows the seal shown in FIG. 18 used as an uncaptivated seal gland.

FIG. 19 shows a seal 370 utilized as an uncaptivated seal gland. In this instance, the force required to assemble the seal 370 will depend primarily on the fluid pressure, acting on the seal plus safety factor. The larger the cross section of the seal, the greater the force that will be acting on the seal due to the fluid pressure trying to disassemble such seals from the housing 372. In this instance, the assembly force should be directly related to the force derived by the pressure acting on the seal 372. In the uncaptivated groove 374, the variation assembly force should be minimum so as to minimize damage to the seal 372 during assembly as the assembly force is applied directly onto the plastic ring 376 and if excessive force is applied, it may cause damage to the ring 376. In this instance, it is desirable to increase the area of contact between the plastic ring 376 and the metal ring 380 of the retainer 382, such as illustrated in FIG. 14.

Figure 20:
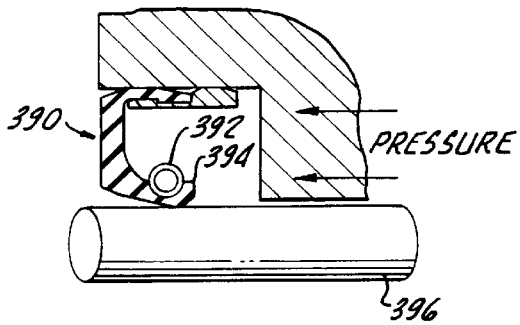
FIG. 20 shows an embodiment of the present invention utilizing a garter-type spring loading a lip off the plastic ring.

FIG. 20 shows an alternative embodiment 390 of the present invention in which a garter type spring 392 is utilized for biasing a lip 394 against a shaft 396.

Figure 21:
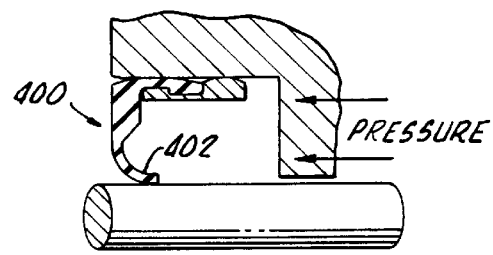
FIG. 21 shows another embodiment of the present invention utilizing a plastic ring with a memory lip.

FIG. 21 shows yet another embodiment 400 in accordance with the present invention which utilizes a lip 402 as hereinabove discussed in connection with FIG. 1.

Figure 22:
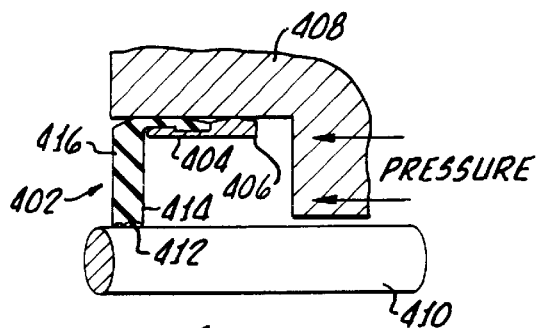
FIG. 22 shows another embodiment of the present invention in which the plastic ring is utilized to provide a clearance seal against a shaft primarily for keeping dust and dirt out.

FIG. 22 illustrates a seal 402 utilizing the principles of the spring portion 404 of a retainer 406 as a clearance seal design primarily for keeping dust and dirt from entering between the housing 408 and shaft 410. In this instance, grooves 412 in an end 14 of the plastic ring 416 are utilized to provide minimum friction between the seal 402 and the shaft 410.

Figure 23:
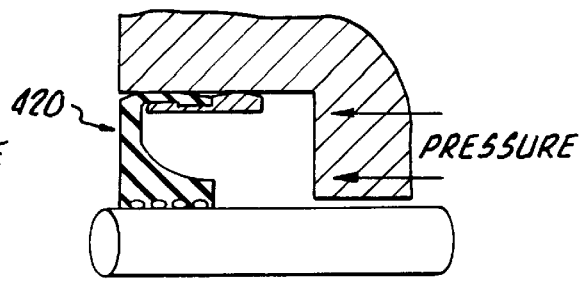
FIG. 23 is a variation of the embodiment shown in FIG. 22.

FIG. 23 shows a variation 20 of a clearance seal similar to that shown in FIG. 22.

Figure 24:
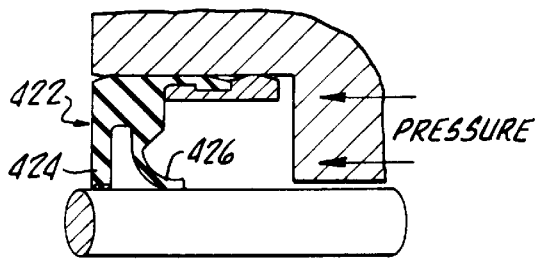
FIG. 24 is an embodiment including the features of FIGS. 21 and 22.

FIG. 24 shows a combination seal 422 utilizing both a clearance seal 424 and a lip seal 426.

Figure 25:
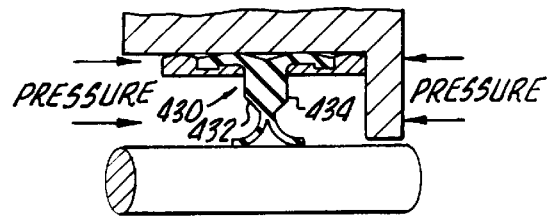
FIG. 25 is a variation of the design shown in FIG. 24 when two seals are assembled back to back.

FIG. 25 shows yet another embodiment of the present invention wherein two seals 432, 434 are utilized back to back.

Figure 26:
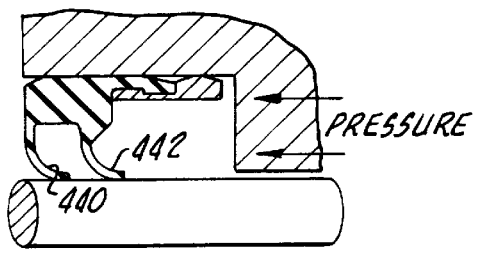
FIG. 26 shows yet another embodiment of the present invention in which the metal retainer ring is pressed into the housing holding a plastic ring seal utilizing two memory lips.

FIG. 26 is yet another embodiment of the present invention in which two lips 440, 442 are used.

Figure 27:
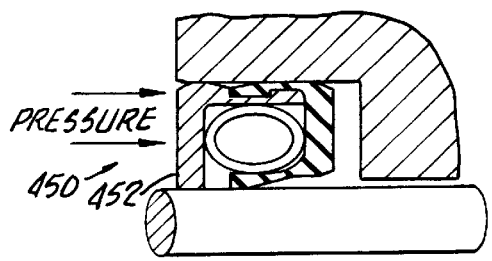
FIG. 27 is a variation of the embodiment shown in FIG. 13 in which an inside diameter of the retainer has been made slightly larger than the shaft diameter.

FIG. 27 shows an embodiment 450 of the present invention similar to that shown in FIG. 13 but with a larger metal retainer step portion 452.

Figure 28:
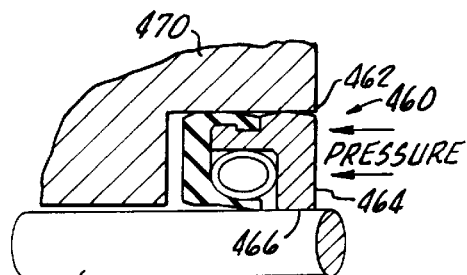
FIG. 28 is another embodiment of the present invention in which the retainer ring provides a labyrinth seal at the ID thereof, the retainer being made of a bearing metal material or a high modulus plastic to provide sufficient force to retain the seal and housing and not damage the shaft.

FIG. 28 shows another embodiment 460 of the present invention in which the metal retainer 462 includes a step portion 464 having grooves 466 for providing a labyrinth seal with a shaft 468. In this instance, it is preferable that the retainer 462 is formed out of a bearing metal material, or a high modulus plastic that would provide sufficient force to retain the seal and the housing 470 and not damage the shaft 468.

Figure 29:
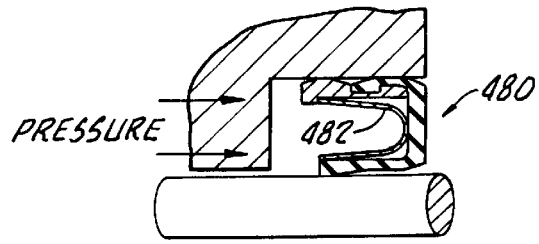
FIG. 29 is another embodiment of the present invention utilizing a V-type, or finger-type metallic spring.

FIG. 29 shows another embodiment 480 of the present invention utilizing a V-type spring 482.

Figure 30:
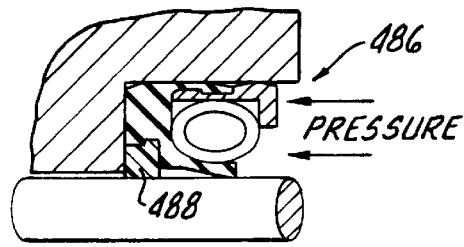
FIG. 30 is yet another embodiment of the present invention utilizing a back-up ring.

FIG. 30 shows yet another embodiment 486 of the present invention utilizing a back-up ring 488.

Figure 31:
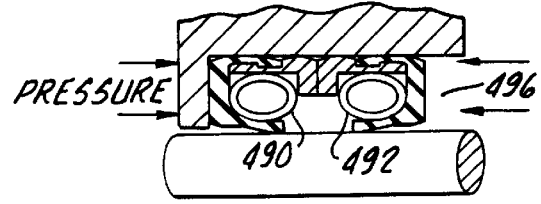
FIG. 31 shows another embodiment of the present invention utilizing two seals of the same design placed end to end.

FIG. 31 illustrates two seals 490, 492 disposed in abutting relationship in a cavity 496 as will be hereinafter discussed in greater detail for use in relatively low pressures.

Figure 32:
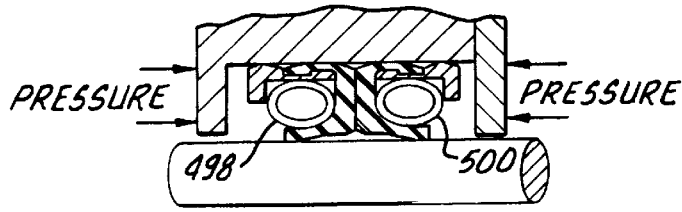
FIG. 32 is an embodiment similar to FIG. 31 in which the relative placement of the seals is reversed.

FIG. 32 shows a variation of the design shown in FIG. 31 in which the seals 498, 500 are disposed back to back in an abutting relationship as will be discussed hereinafter in greater detail.

Figure 33:
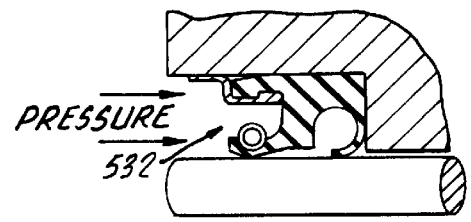
FIG. 33 shows another embodiment of the present invention in which a garter-type is used to apply an extension spring force on the seal onto the shaft for high speed applications along with a secondary memory type seal to prevent contaminants from coming the direction opposite the pressure applied.

FIG. 33 shows another seal 502 using various combinations of the features hereinabove discussed.

Figure 34:
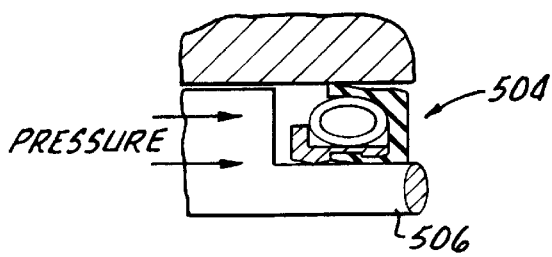
FIG. 34 is yet another embodiment of the present invention in which the seal is mounted on the shaft instead of the housing.

FIG. 34 shows yet another embodiment of the present invention 504 in which the seal 504 is mounted in the shaft 506.

The present invention relates primarily to the manner in which the hereinabove individual seal cartridges may be stacked—one behind the other—to prevent the secondary in subsequent seals from collapsing when under high fluid pressure as will be hereinafter discussed in greater detail.

Figure 35:
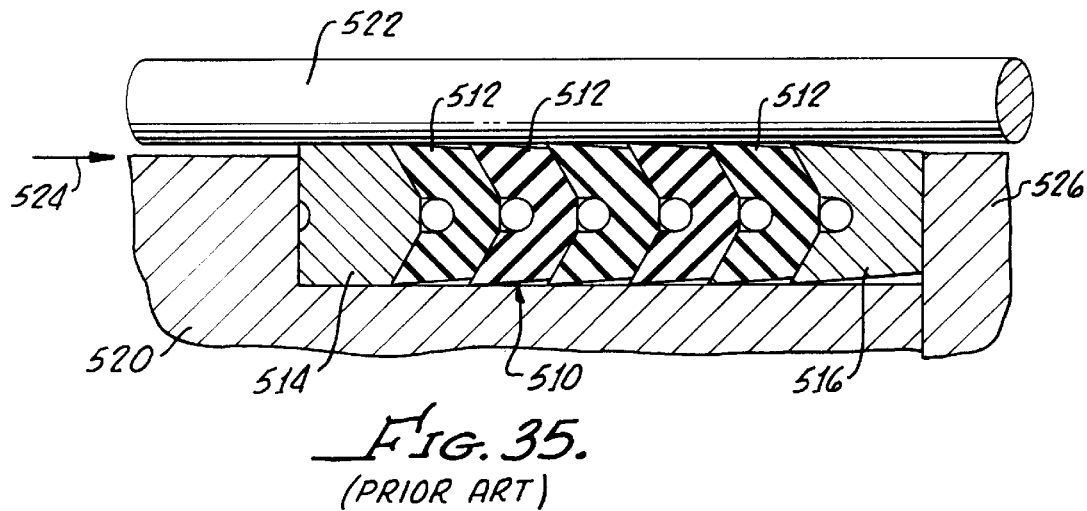
FIG. 35 is an illustration of a prior art cartridge seal stack utilizing a typical V-Ring seal.

The present invention must be contrasted from a typical prior art seal stack 510 as shown in FIG. 35. This stack 510 utilizes individual V-ring seals 512 formed from elastomer or plastics. The individual seals 512 are pressed fitted into a butting relationship by end pieces 514, 516 which hold the stack 510 between a housing 520 and a shaft 522. As apparent in FIG. 35 pressure, as indicated by the arrow 524, is applied to the end piece 514 which is transmitted through all of the individual seals 512 to the end piece 516 and backing plate 526.

Accordingly, pressure is transmitted equally throughout the entire seal stack 510, thus, all the seal wear proportionately since the pressure is evenly applied throughout the entire seal stack. That is, each of the individual seal 512 is under the same pressure. No radial adjustment is provided, and accordingly, as the individual seal 512 wear leakage occurs and eventually replacement of the entire stack is necessary.

Figure 36:
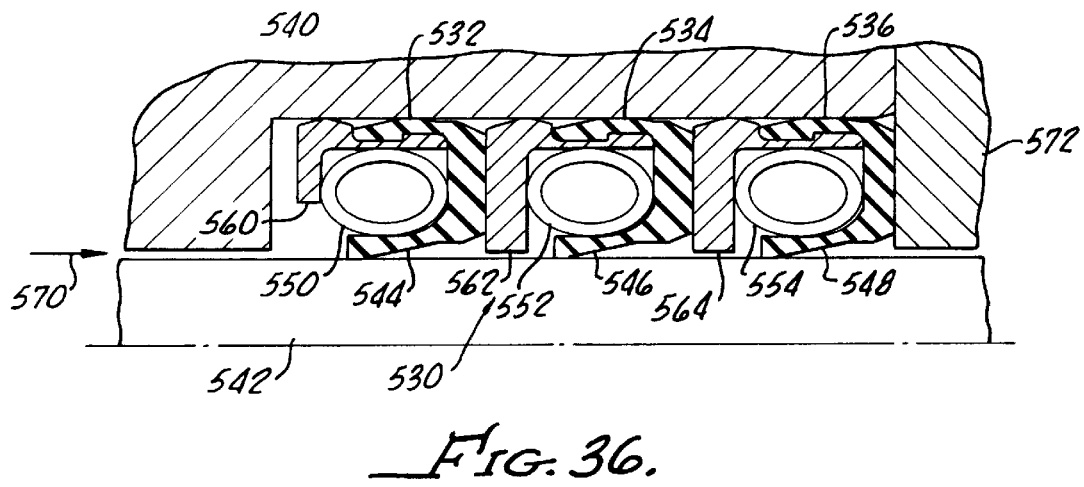
FIG. 36 is an illustration of a cartridge seal stack in accordance with the present invention which allows individual sealing of each seal cartridge. This permits the first seal to provide the primary sealing followed by the second seal and the third seal.

This should be contracted with the rotary cartridge of seal stack assembly 530 in accordance with the present invention as shown in FIG. 36 which illustrates a plurality of rotary cartridge seals 532, 534, 536 disposed in an abutting relationship between a housing 540 and a shaft 542.

It should be appreciated that the individual cartridge seals 532, 534, 536 correspond to the embodiment 206 shown in FIG. 3. However, any of the hereinabove discussed individual seal cartridges may be utilized in accordance with the present invention. Further, any of the embodiments hereinabove shown in FIGS. 1–34 may be used in any combination to provide various seal stack configurations. The embodiment 532, 534, 536 are only shown here as representative. Hereinafter other typical combinations of individual seal cartridges will be discussed in the formation of the seal stack in accordance with the present invention.

Briefly, each of the cartridge seals 532, 534 include the cold flowable plastic ring 544, 546, 548 respectively, along with springs 550, 552, 554 and separable metal retainers 560, 562, 564 similar to those elements hereinabove discussed in connection with the embodiment 206 shown in FIG. 13.

It should be easily appreciated that pressure represented by the arrow 570 is applied to the first seal 532 since the seal 532 provides individual sealing between the housing 540 and the shaft 542 of the fluid pressure. No significant fluid or fluid pressure is passed to the subsequent seals 534, 536. Only a mechanical force generated against the first seal 532 by the fluid pressure is transferred to the abutting seals 534, 536. A backing plate 572 stabilized the stack 530 between the housing shaft 540 and shaft 542.

Figure 37:
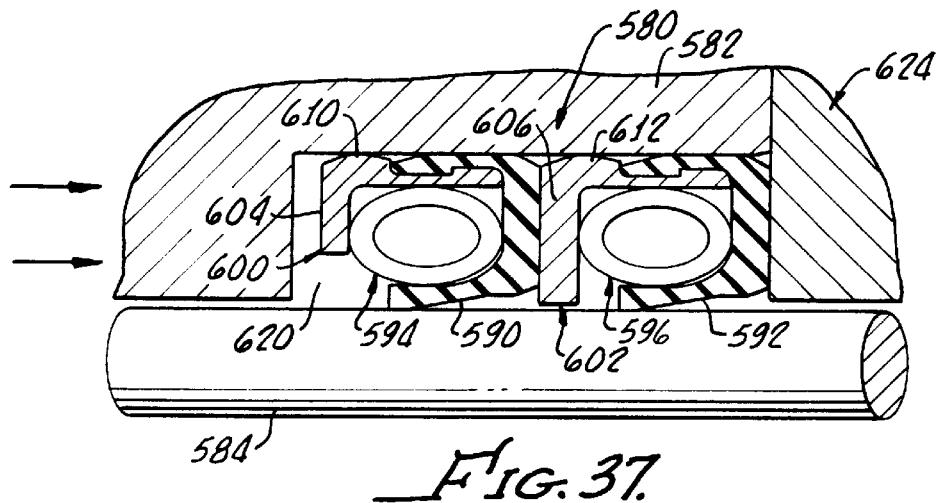
FIG. 37 shows a seal stack mounted on a housing, only two seal cartridges being shown for illustration.

With reference to FIG. 37, there is shown a seal stack 580 disposed between a housing 582 and a reciprocating shaft 584. Seal ring 590, 592 are identical as well as the springs 594, 596. The retainer rings 600, 602 have a difference of length depending portions 604, 606. As hereinabove described, the rings 604, 606 stabilized the assemblies by creating an interference between an outside diameter 610, 612 and the housing 582.

Springs 594, 596 provide a radial load onto the sealing ring 590, 592 respectively to provide initial sealing. As the pressure acting on the seal increases the function of the spring 594, 596 decreases. A clearance 620 exists between the shaft 584 and the depending portion 604 to allow fluid to energize the sealing ring 590. The force due to pressure applied on to the seal assembly 610 is to the seal assembly as simply 612 through the seal ring 590 and on to the retainer 606 of the assembly 612. A backup plate 624 supports the force developed by the pressure acting on both the seal assemblies 610, 612.

In this arrangement the seal assembly 610 is the primary seal and the seal assembly 612 is the secondary seal. The seal assembly 610 provides the maximum sealing ability, in turn, results in the highest wear and the seal assembly 612 acts as insurance, providing added reliability to the seal assembly 610. Should the seal assembly 610 fail, seal assembly 612 takes over as the primary seal. By stacking several seals of pressure acting on the first seal 610 will always be greater than the subsequent seals, and in such cases wear on the subsequent seal 612 will be diminished depending upon the pressure acting on the subsequent seal 612. Thus, the stacking of the seals maximizes the life of the stack 580.

Figure 38:
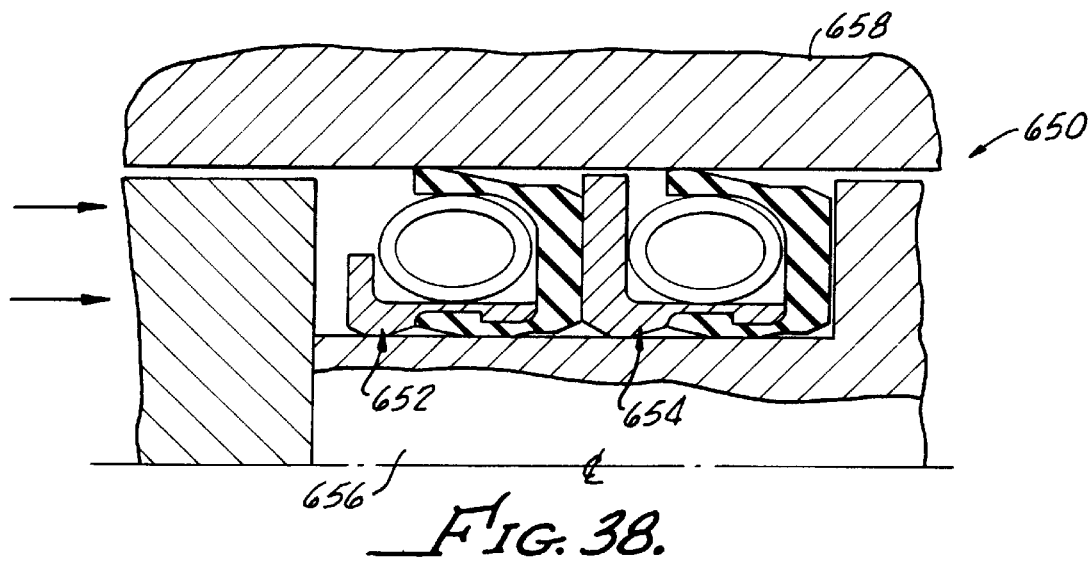
FIG. 38 shows a seal stack assembly similar to that shown on FIG. 37 with individual seal cartridges mounted on the shaft instead of the housing.

With reference to FIG. 38 there is shown another embodiment 650 in accordance with the present invention in which individual seal assemblies 652, 654 are mounted on a shaft 656 for seal against a housing 658.

Figure 39:
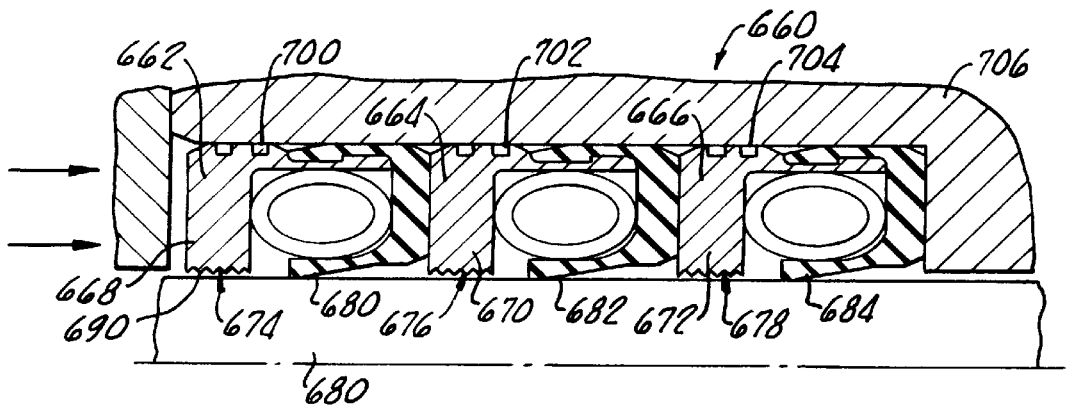
FIG. 39 shows an alternative embodiment of the seal stack in accordance with the present invention in which a support plate locking ring serves an added function by maintaining a close tolerance with the shaft.

FIG. 39 shows another embodiment 660 utilizing retainer rings 662, 664, 666 having long depending portions 668, 670, 672 in order to provide a close tolerance indicated at 674, 676, 678 between a shaft 680 and the rings 662, 664, 666 respectively.

By maintaining this minimum clearance possible pressure differential may be established between the initial pressure acting in the internal portion of the seal ring assembly 660. By maintaining a minimum clearance which is shown in FIG. 39, such pressure drop may be achieved, especially in those applications where variable pressure occurs during the operation of the unit such as those cases where the pressure applied varies with the cycling operation such as compressors, reciprocating plunger pumps and so forth. In such cases the clearance seal allows a pressure differential between the actual pressure applied in the actual pressure acting on the sealing lips 680, 682, 684 and lower the pressure acting on the sealing lips 680, 682, 684 the lower the seal wear.

Again, as hereinbefore discussed, by providing the seal stack 660, pressure on subsequent seals is diminished and therefore the force acting on the sealing lips 682, 684 is also less.

The rings 668, 670, 672 are preferably made from metallic materials to provide better support under conditions of high pressure, but elastic materials may be utilized to permit a closer minimum clearance gap between the shaft 680 and the depending portions of 668, 670, 678. Groove 690 also may by utilized to vary the degree of pressure drop acting through the clearance area.

Hereinabove seals stack assemblies 530, 580 are press fit between the shafts 542, 584 and respective housings 540, 582. In the embodiment 660 shown in FIG. 39 canted coil spring assemblies 700, 702, 704 may be utilized to seal the stacks between the shafts 680 and housing 706.

Figure 40:
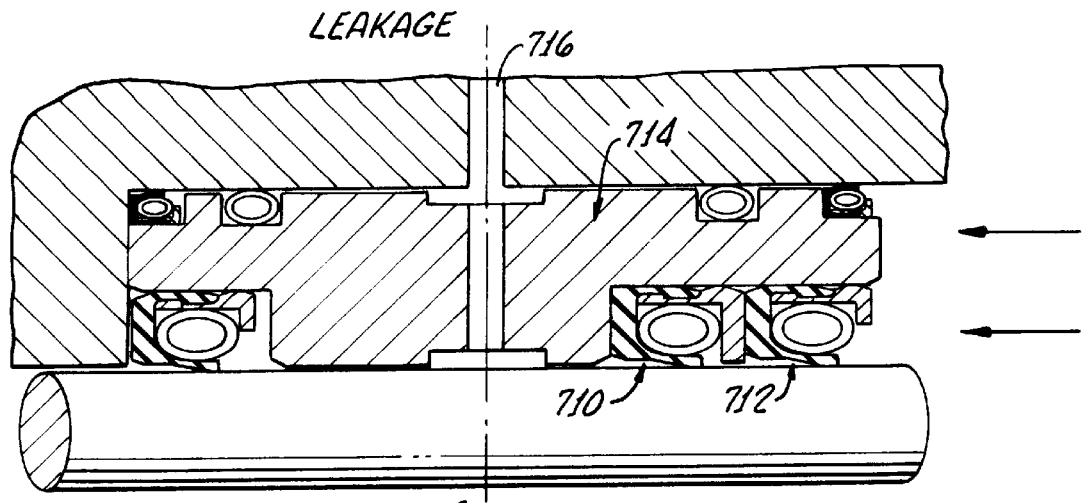
FIG. 40 shows a seal stack assembly mounted in a cartridge bearing assembly.

With reference to FIG. 40 there is shown stacked seals 710, 712 in a bearing assembly 714. In this instance should leakage occur past the seals 710, 712 such leakage may be removed through a central port 716.

Figure 41:
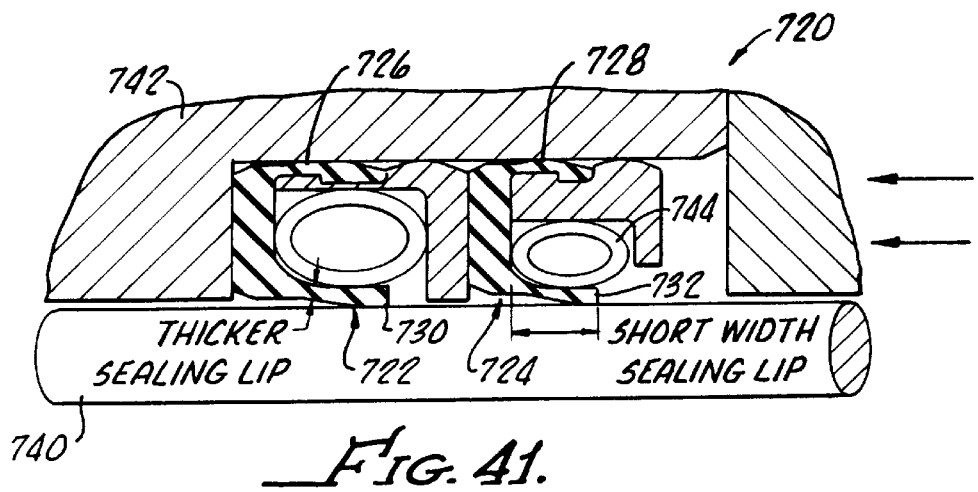
FIG. 41 shows another variation of the seal stack assembly in accordance with the present invention wherein individual seal cartridges have different lip widths.

With reference to FIG. 41 there is shown a seal stack assembly 720 including two seals assemblies 722, 724 having sealing rings 726, 728 with lips 730, 732 of different width. The primary seal 724 has a shorter width sealing lip 732 the secondary seal 722. Both seals 720, 724 have the same outside diameter for mounting between a shaft 740 and the housing 742. The shorter width sealing lip 732 offers an advantage in that the area in which the pressure applied thereto is less. Therefore the force acting on the sealing lip 732 is reduced by such width differential and therefore, the possibility of seal wear decreases. However, the main disadvantage is that deflection of the spring 744 decreases, which, in some cases, may not be sufficient to take up the possible variations and eccentricities and misalignment that may occur on the shaft.

Figure 42:
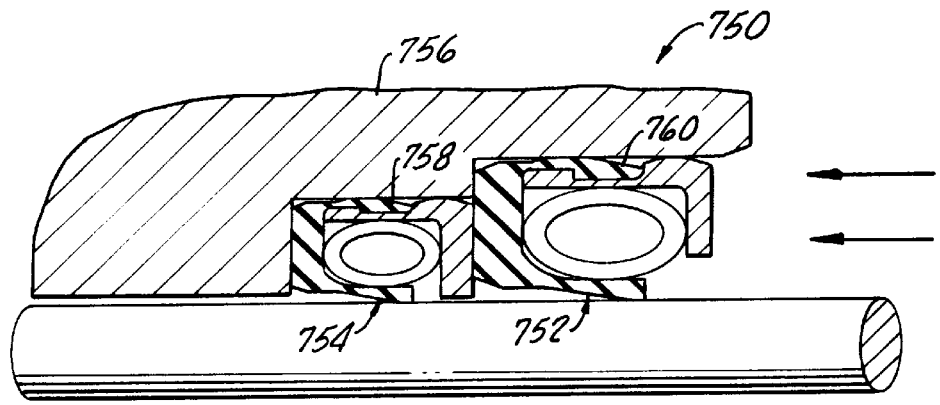
FIG. 42 shows yet another alternate design in accordance with the present invention in which a primary seal cartridge is larger in cross section and seal width than a secondary seal cartridge.

FIG. 42 illustrates another seal stack 750 in which the primary seal 752 is larger in cross section than the secondary seal 754. In this instance, the housing 756 has two-step gland diameters 758, 760.

Figure 43:
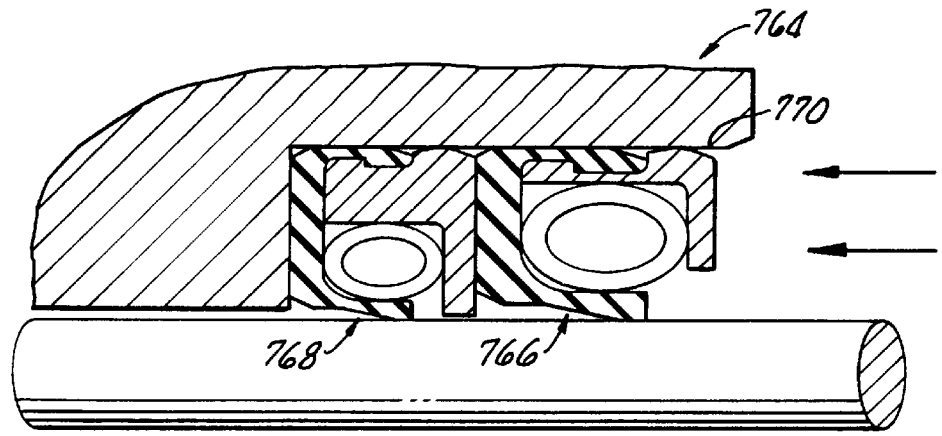
FIG. 43 shows another seal stack assembly in accordance with the present invention in which a primary seal cartridge is wider than the secondary seal cartridge with both having the same gland housing diameter.

FIG. 43 shows an alternative rotary cartridge seal stack 764 in which the primary seal 766 is wider than the secondary seal 768 with both seal 776, 768 having the same housing diameter 770.

Figure 44:
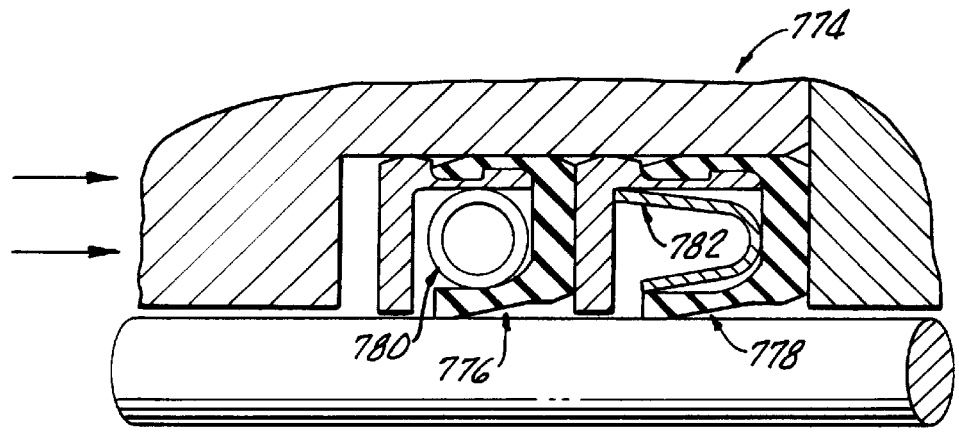
FIG. 44 illustrates a seal stack assembly in accordance with the present invention utilizing different types of seal energizers, or springs, within the individual cartridge seals.

FIG. 44 illustrates a seal stack 774 in accordance with the present invention in which the primary seal 776 and secondary seal 778 utilize different types of springs. As shown, the seal 776 utilizes a ribbon type spring 780 and the secondary seal 778 utilizes a cantilever finger type spring 782. Other types of springs 780, 782, or seal energizers, may be used instead of those illustrated. For example, elastomer "O" Rings, or elastomer filled springs may be utilized in the seals and the seal stacks of the present invention.

Figure 45:
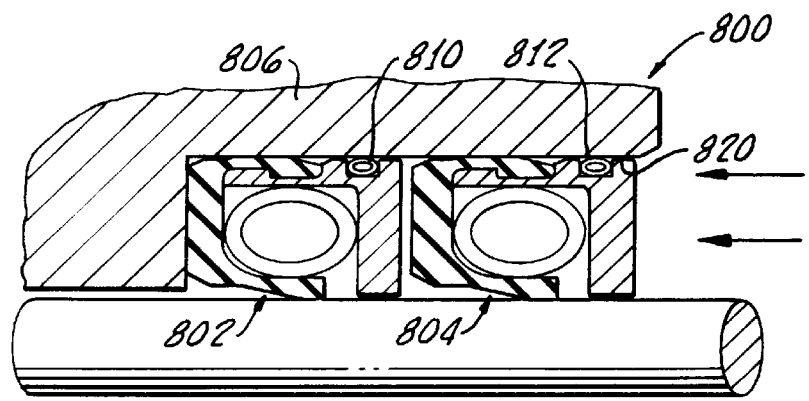
FIG. 45 is another embodiment of the present invention in which the individual seal cartridges of the stack utilize a circular canted coil spring or "O" Ring.

FIG. 45 shows yet another seal stack embodiment 800 in accordance with the present invention in which the individual seal assemblies 802, 804 are held within housing 806 through the use of circular canted coil locking springs, or "O" Rings 810 or 812 or a combination thereof. Alternatively, one of the assemblies 802, 804 may be press fit into the housing 806 as hereinabove shown, and another seal assembly utilizing the coil spring, 810, 812 may be abutted thereagainst.

Such springs were "O" Rings 812 may be utilized in certain circumstances where an interference, or press fit may cause galling, or excessive force may be necessary, or there are wide variation in a housing bore 820.

Although there has been hereinabove described a specific embodiment of a rotary cartridge seal stack in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art should be considered to be within the scope of the present invention as defined in the appended claims.

What is claimed is:

1. A rotary cartridge seal stack assembly comprising:
  a plurality of rotary cartridge seals disposal in an abutting relationship between a housing bore and a shaft, each rotary cartridge real comprising:
  a cold flowable plastic ring having body means for sealably engaging a housing bore and lip means for sealably engaging a shaft rotating within said housing bore;
  separable metal retainer means for fixing said plastic ring and spring within said housing bore and around said shaft, said separable metal retainer means having a surface of revolution with a rear portion having a radius suitable for press fitting into said housing bore; and
  means defining an internal groove in said body means for engaging the ring therein in order to latch the plastic ring and metal retainer means together with residual stress in both axial and radial directions within the plastic ring due to the groove and ring dimensions and shape;

said internal groove having a diameter greater than the ring and wherein a width of said internal groove is smaller than a width of the ring in order to maintain axial stress in the plastic ring.

2. The seal according to claim 1 wherein said internal groove has a radius greater than the ring and the metal retainer front portion adjacent the ring has an outside radius less that a contacted inside radius of the plastic ring body means adjacent said internal groove in order to maintain the radial stress in said plastic ring.

3. The seal according to claim 2 wherein a width of said internal groove is greater than a width of the ring but less than a width necessary to accept excess plastic forced by the radial stress due to cold flow into said groove means thereby maintaining the axial stress in the plastic ring.

4. The seal according to claim 3 wherein said lip means includes head means, disposed at an end of said lip means, for engaging the shaft.

5. The seal according to claim 4 wherein said plastic ring further comprises means for defining a second groove adjacent said lip means and spring means, disposed in said second groove, for biasing said lip means against said shaft.

6. The seal according to claim 5 wherein the metal retainer means comprises radially inwardly extending step means for facilitating separation of the metal retainer means from said housing bore.

7. The Seal according to claim 6 wherein the plastic ring includes means defining flats on an outside surface thereof, for restricting rotary motion of the plastic ring.

8. A rotary cartridge seal stack assembly comprising:
a plurality of rotary cartridge seals disposed in and abutting relationship between a housing bore and a shaft, each rotary cartridge real comprising:
a cold flowable plastic ring having body means for sealably engaging a housing bore and lip means for sealably engaging a shaft rotating within said housing bore;
separable metal retainer means for fixing said plastic ring within said housing bore and around said shaft, said separable metal retainer means having a surface of revolution with a rear portion having a diameter suitable for press fitting into said housing bore and a front portion of lesser diameter ending in a ring; and
means defining an internal groove in said body means for engaging the ring therein in order to latch the plastic ring and metal retainer means together with residual stress in an axial direction within the plastic ring due to the groove and ring dimensions and shape, said internal groove having a diameter greater than the ring and wherein a width of said internal groove is smaller than a width of the ring in order to maintain axial stress in the plastic ring.

9. The seal according to claim 8 wherein said internal groove is generally rectangular with a dovetail sidewall facing a rear side of said ring.

10. The seal according to claim 8 wherein the metal retainer means forward portion includes means defining a thin cross section in the forward portion, for providing a radial force on the plastic ring body means in order to cause radial stress therein.

11. The seal according to claim 10 wherein the forward portion of the metal retainer means includes means, defining longitudinal grooves on a inside surface thereof, for providing enhanced radial stress in the plastic ring body means.

12. The seal according to claim 11 wherein the plastic ring includes means, defining flats on an outside surface thereof, for restricting rotary motion of the plastic ring.

13. The seal according to claim 10 wherein said plastic ring is U-shaped and further comprising spring means, disposed between said lip means and said body means for biasing said lip means against said shaft, said spring means being disposed in a position bearing against the metal retainer means from portion.

14. The seal according to claim 8 wherein said plastic ring is U-shaped and further comprising spring means, disposed between said lip means and said body means for biasing said lip means against said shaft, said spring means being disposed in a position bearing against the metal retainer means front portion.

15. A rotary cartridge seal stack assembly compressing:
a plurality of rotary cartridge seals disposed in an abutting relationship between a housing bore and a shaft, each rotary cartridge real comprising:
a cold flowable plastic ring having body means for sealably engaging a housing bore and lip means for sealably engaging a shaft rotating within said housing bore;
spring means, disposed between the body means and the lip means, for biasing said lip means against the shaft;
separable metal retainer means for fixing said plastic ring and spring within said housing bore and around said shaft, said separable metal retainer means having a surface of revolution with a rear portion having a radius suitable for press fitting into said housing bore and a front portion of lesser radius ending in a ring, said rear portion and ring being connected by a thin spring portion; and
means defining an internal groove in said body means for engaging the ring therein in order to latch the plastic ring and metal retainer means together with residual stress in a radial direction within the plastic ring due to biasing action by the retainer means spring portion.

16. The seal according to claim 15 wherein the retainer means further includes step means, inwardly depending from said rear portion, for both holding the spring means between the body means and lip means, and for facilitating removal of the seal from engagement with the housing bore and shaft.

17. The seal according to claim 15 wherein the retainer means further includes step means, inwardly depending from said rear portion and having a selected thickness, for controlling the force needed to press fit the retainer means into the housing bore.

18. The seal according to claim 15 wherein said rear portion comprises a thin flange spring for engaging the housing bore.

19. The seal according to claim 18 wherein said body means further comprises inwardly depending on flange means for both holding the spring means between the body means and lip means, and for facilitating removal of the seal from engagement with the housing bore and shaft.

20. The seal according to claim 15 wherein the retainer means rear portion comprises a plurality of load rings for engagement with said housing bore.

21. The seal according to claim 15 wherein the retainer means rear portion is undercut for controlling engagement force between the body portion and the housing bore.

22. The seal according to claim 21 wherein said undercut is radial.

23. The seal according to claim 21 wherein said undercut is axial.

24. A rotary cartridge seal stack assembly comprising:
a plurality of rotary cartridge seals disposed in an abutting relationship between a housing bore and a shaft, each rotary cartridge real comprising:

a cold flowable plastic ring having body means for sealably engaging a housing bore and lip means for sealably engaging a shaft rotating within said housing bore;

spring means, disposed between the body means and the lip means, for biasing said lip means against the shaft;

separable metal retainer means for fixing said plastic ring within said housing bore and around said shaft, said separable metal retainer means having a surface of revolution with a rear portion having a radius suitable for press fitting into said housing bore and a front portion of lesser radius ending in a ring;

means defining an internal groove in said body means for engaging the ring therein in order to latch the plastic ring and metal retainer means together; and spring portion means, connecting the retainer rear portion and ring, for controlling residual stress in a radial direction within the plastic ring and preventing shrinkage of the plastic ring toward the shaft.

25. The seal according to claim 24 wherein the retainer means further includes stop means, inwardly depending from said rear portion, for both holding the spring means between the body means and lip means, and for facilitation removal of the seal from engagement with the housing bore and shaft.

26. The seal according to claim 24 wherein said rear portion comprises a thin flange spring for engaging the housing bore.

27. The seal according to claim 26 wherein said body means further comprises inwardly depending flange means for both holding the spring means between the body means and lip means, and for facilitating removal of the seal from engagement with the housing bore and shaft.

28. The seal according to claim 24 wherein the retainer means further includes step means, inwardly depending from said rear portion and having a selected thickness, for controlling the force needed to press fit the retainer means into the housing bore.

29. The seal according to claim 24 wherein the retainer means rear portion comprises a plurality of load rings for engagement with said housing bore.

30. The seal according to claim 24 wherein the retainer means rear portion is undercut for controlling engagement force between the body portion and the housing bore.

31. The seal according to claim 30 wherein said undercut is radial.

32. The seal according to claim 30 wherein said undercut is axial.

* * * * *